(12) United States Patent
Anderson

(10) Patent No.: US 9,347,477 B2
(45) Date of Patent: May 24, 2016

(54) SLATWALL DISPLAY FASTENER AND CONNECTOR AND SYSTEM THEREFORE

(71) Applicant: Process Displays, Minneapolis, MN (US)

(72) Inventor: Rick David Anderson, Minneapolis, MN (US)

(73) Assignee: Process Displays, Minneapolis, MN (US)

( * ) Notice: Subject to any disclaimer, the term of this patent is extended or adjusted under 35 U.S.C. 154(b) by 0 days.

(21) Appl. No.: 14/171,263

(22) Filed: Feb. 3, 2014

(65) Prior Publication Data

US 2015/0117980 A1 Apr. 30, 2015

Related U.S. Application Data

(63) Continuation-in-part of application No. 14/067,333, filed on Oct. 30, 2013.

(51) Int. Cl.
*F16B 21/02* (2006.01)
*F16B 35/06* (2006.01)

(52) U.S. Cl.
CPC .................. *F16B 21/02* (2013.01); *F16B 35/06* (2013.01)

(58) Field of Classification Search
CPC ........ F16B 35/00; F16B 35/04; F16B 35/044; F16B 35/045; F16B 23/007; F16B 21/02
USPC ......... 411/378, 396–397, 401–402, 403, 409, 411/480, 482, 548, 508–509
See application file for complete search history.

(56) References Cited

U.S. PATENT DOCUMENTS

| | | | | |
|---|---|---|---|---|
| 29,720 A | * | 8/1860 | Sargent | 411/397 |
| 74,692 A | * | 2/1868 | Ives | 411/397 |
| 1,561,003 A | * | 11/1925 | Leloup | 411/402 |
| 1,897,196 A | * | 2/1933 | Hunt | 411/389 |
| 2,531,892 A | * | 11/1950 | Reese | 403/11 |
| 2,741,289 A | * | 4/1956 | Grow | 411/185 |
| 3,337,925 A | * | 8/1967 | Meyer | 24/290 |
| 3,722,037 A | * | 3/1973 | Jaeger | B25B 31/005 116/106 |
| 3,727,271 A | * | 4/1973 | Znamirowski | F16B 21/086 411/508 |
| 3,832,931 A | * | 9/1974 | Talan | 411/80.2 |
| 4,157,674 A | * | 6/1979 | Carlson et al. | 411/389 |
| 4,169,308 A | * | 10/1979 | Minogue | 29/407.1 |
| 4,540,322 A | * | 9/1985 | Coffia | 411/338 |
| 5,059,077 A | * | 10/1991 | Schmid | 411/400 |
| 5,226,766 A | * | 7/1993 | Lasner | A61B 17/863 411/308 |
| 5,358,367 A | * | 10/1994 | Yang | 411/397 |
| 5,395,196 A | * | 3/1995 | Notaro | 411/396 |
| 5,551,817 A | * | 9/1996 | Kanie | F16B 37/0842 411/107 |
| 5,669,592 A | * | 9/1997 | Kearful | 248/217.4 |
| 5,716,161 A | * | 2/1998 | Moore | F16B 5/065 24/453 |
| 5,851,097 A | * | 12/1998 | Shereyk | F16B 5/065 411/508 |

(Continued)

*Primary Examiner* — Roberta Delisle
(74) *Attorney, Agent, or Firm* — Daniel A. Rosenberg; Briggs and Morgan, P.A.

(57) ABSTRACT

The invention relates to a reusable fastener designed to secure material such as promotional posters, displays, and brackets to slatwall or peg board or other backing in a retail environment. The fastener has a head designed to receive display material without removal, and includes brackets and other items as part thereof.

25 Claims, 23 Drawing Sheets

(56) References Cited

U.S. PATENT DOCUMENTS

| | | | |
|---|---|---|---|
| 5,897,278 A * | 4/1999 | Frattarola | F16B 21/02 411/350 |
| 6,474,921 B1 * | 11/2002 | Gordon | F16B 1/0071 411/45 |
| 6,612,795 B2 * | 9/2003 | Kirchen | F16B 21/02 24/297 |
| 6,769,853 B2 * | 8/2004 | Perrot | F16B 5/0628 296/191 |
| 7,290,972 B2 * | 11/2007 | Gauthier | 411/387.1 |
| 7,328,489 B2 * | 2/2008 | Leverger | F16B 5/0628 24/292 |
| 7,698,787 B2 * | 4/2010 | Scroggie | F16B 21/082 24/297 |
| 7,713,013 B2 * | 5/2010 | Sedgwick et al. | 411/411 |
| 7,883,307 B2 * | 2/2011 | Pippard | F16B 25/0026 411/387.1 |
| 2013/0289630 A1 * | 10/2013 | Fritzinger | 606/301 |

\* cited by examiner

SLATWALL DISPLAY FASTENER AND CONNECTOR AND SYSTEM THEREFORE

RELATED APPLICATIONS

The present application is a continuation-in-part of U.S. patent application Ser. No. 14/067,333 filed Oct. 30, 2013, and incorporates the foregoing by reference hereto.

BACKGROUND

1. Field of the Invention

This invention relates to a connector or fastener, and a system therefore, for use with a display material. In particular, the invention relates to a reusable fastener designed to secure material such as promotional posters, displays, and brackets to a peg board or slatwall display or other backing in a retail or similar environment. Of course, a person of ordinary skill in the art will understand that the invention is not necessarily so limited.

2. Background of the Invention

In retail environments promotional and marketing display material are commonly affixed to open wall space near, or in anticipation of the arrival of, goods or services for sale. Conventionally, these materials, which can include posters, displays, product samples, or other materials, are affixed to a backing adapted for repeated display and removal of the items. A common type of backing is referred to as peg board, which consists of a durable material with a pattern of perforations located in a predetermined pattern. Connectors, fasteners, or brackets are designed to secure materials to the peg board in a secure or releasably secure manner. Also, due to the fact that these displays are frequently changed the connectors and fasteners must be reasonably capable of removal to allow for such updates. The prior art, however, fails to adequately accomplish these goals.

Prior art connectors, as shown in FIG. 1, include devices that comprise a generally flat head connected to an extended body that is sized to be captured in the spaced apart holes of the peg board. The connectors pass through holes in the material to be displayed and then into the peg board and thereby provide a reasonably stable mounting mechanism.

Such connectors include so called "canoe clips." These clips have a body that includes an elongated center gap and are sized slightly wider than the peg board holes, such that upon insertion the body is compressed about the gap to form sufficient tension to retain the clip. The head of the clip is flat without any indentations or grooves for removal or insertion. In fact, the clips do not include any particular structural elements to allow for removal. When the display is replaced the clips are pulled or pried out of place, normally in a destructive manner, thrown away and new clips are used for the next display. In this manner the clips are disposable and not suitable for reuse, and removal frequently results in damage to the underlying peg board which may also need replacement.

Another such device is the "Christmas tree" clip. These clips also contain a head and body, however, in this case the body includes a plurality of teeth disposed along the axis of the body, and each tooth is comprised of a circumferential flange angled to resist removal after insertion. Again, the clips do not include any convenient means of removal and are therefore designed for one-time disposable use, and when they are removed they also damage the peg board.

While these prior art clips are generally inexpensive plastic articles, ultimately the cost of continued replacement of used clips becomes very significant. The difficulty of inserting and removing the clips consumes a great deal of unnecessary labor, as well as frustration. Furthermore, the environmental impact of disposable clips is detrimental. Additionally, as noted, because these clips are not designed to be removed easily, over time they damage the peg board requiring further costs and expense. The combined cost of these inefficiencies is substantial, and can be in the millions of dollars or more every year for retailers and others that use peg board displays and the like.

Another use of such clips is to assemble displays, and in particular assembly of cardboard or corrugated display material. One such prior art device is known as the Viking clip, which is comprised of plastic and consists of a flathead screw with a nut or wing nut that affixes to the screw. The Viking clip, however, requires manipulation from both sides of the assembly since the nut must be placed on the screw after the screw is placed through the assembly. Frequently, given the size of the assemblies, this requires two people to perform the assembly. Viking clips are also sometimes used with peg board displays, but suffer from the drawbacks described herein.

The prior art clips suffer from another material drawback, they do not meet the full range of needs required for displays and in particular peg board displays. Displays frequently require more than just pinning a poster, backer, or header to the peg board. There is a need to affix brackets, dimensional signage, product samples, powered items, and the like. The prior art clips cannot meet these needs.

Another type of backing used in displays, and other applications, is slatwall (also known as slotwall) is a building material used in shopfitting for wall coverings or display fixtures. It consists of panels made with horizontal grooves that are configured to accept a variety of merchandising accessories. The panels are typically made from medium-density fiberboard (MDF), with a finish such as melamine paper pressed or laminated onto one or both sides. Grooves are then machined into the board and painted or fitted with plastic or aluminum inserts, which can then be used to attach or hang various items therefrom. Slatwall is used in retail environments, to machine shops, garages, basements, and the like.

Heretofore, it has not been possible to use any of the clip based systems with slatwall because clips do not have the ability to fit in the elongated horizontal groove of the slatwall.

Accordingly, a need exists for a fastener or clip, and system therefore, that overcomes the difficulties of the prior art.

DETAILED DESCRIPTION OF THE PREFERRED EMBODIMENTS

Figure 1A:
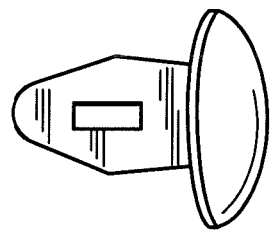
FIG. 1A shows a side view of a prior art canoe clip.
Figure 1B:
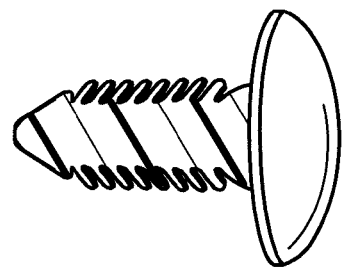
FIG. 1B shows a side view of a prior art Christmas tree clip.
Figure 1C:
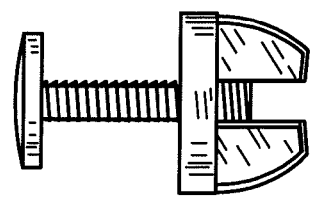
FIG. 1C shows a side view of a prior art Viking clip.
Figure 2A:
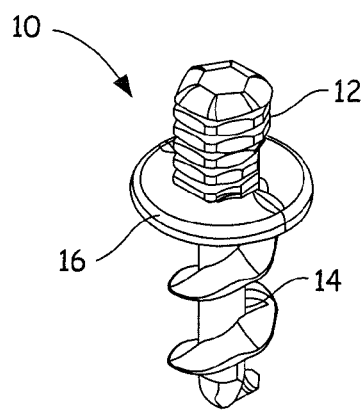
FIG. 2A shows a perspective view of a hex head fastener.
Figure 2B:
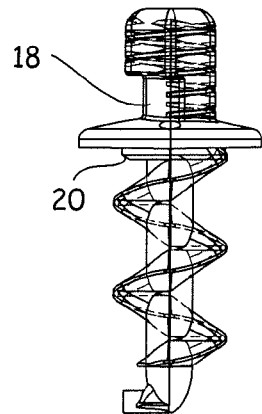
FIG. 2B shows a side view of the fastener of FIG. 2A.
Figure 2C:
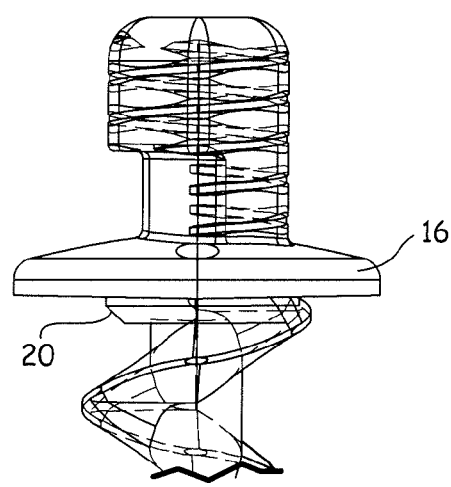
FIG. 2C shows a side view of the top of the fastener of FIG. 2A.
Figure 3A:
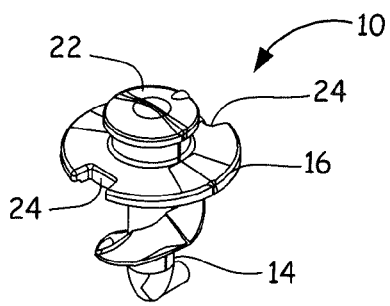
FIG. 3A shows a perspective view of a low profile fastener.
Figure 3B:
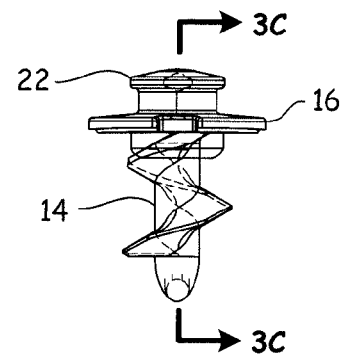
FIG. 3B shows a side view of the fastener of FIG. 3A.
Figure 3C:
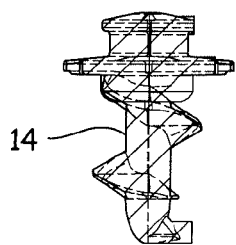
FIG. 3C shows a sectional view taken along the line labeled 3C of FIG. 3B.
Figure 3D:
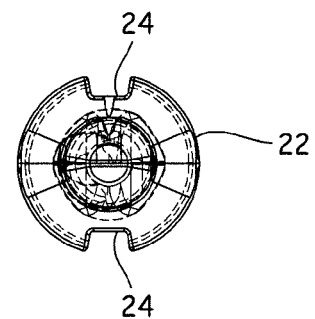
FIG. 3D shows a top view of the fastener of FIG. 3A.
Figure 3E:
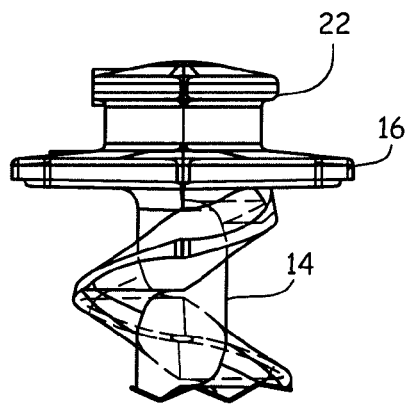
FIG. 3E show a partial side view of the fastener of FIG. 3A.

In the Figures, a system for affixing display materials to a surface is shown. In particular, FIG. 2 show views of a fastener 10 adapted for use with a display surface, such as peg board, walls, and the like.

The fastener 10 includes a head 12, which is hexagonal in shape. The hexagonal shape allows for the use of one or more tools (described below) to grip the head 12 and drive the fastener 10 into place and for removal of the fastener 10. The head 12 is also threaded to allow for securement of various devices to the head 12 (detailed below). The head includes a notch 18 along the bottom of one side of the head 12. The notch, as described below, provides a gripping mechanism to retain in place paper items such as posters, backers, headers, and the like, that are placed over the head 12 of the fastener.

The fastener 10 includes a stem 14, which is inserted in the surface, such as a hole in peg board. The stem 14 is threaded, and more particularly, includes wide spaced threads that allow for insertion of the fastener 10 with a minimal number of turns. The fastener 10 is comprised of a semi-rigid material, such as plastic, such that it easily stays in place when inserted into a surface, but does not damage the surface when inserted and removed (especially in the case or peg board).

The fastener 10 includes a base 16, which forms a circular skirt between the head 12 and the stem 14. The base 16 has a diameter greater than that of the stem 14 and stem threads, and greater than the hole in which the fastener 10 is inserted. This provides for a snug fit substantially flush with the hole into which the fastener 10 is inserted. A tapered bevel 20 is included on the bottom of the base 14, which is closer in diameter to the hole in which the fastener 10 will be inserted to allow for more easily centering the fastener 10 into the hole, as well as enhancing the snug fit when inserted.

The threads on the stem 14 are tapered/narrowed at the point where they contact the bevel 20 to allow for a flat even fit with the fastener 10 is inserted and threaded into the hole.

The fastener 10 is designed to be inserted and removed with a tool 100, described in detail below.

FIG. 3 show various views of an alternative fastener 10, and in particular a low profile fastener 10. The fastener 10 includes a head 12, which has a substantially lower profile than the fastener 10 shown in FIG. 2. The head 12 has a circular flange 22, which performs the same function as the notch 18 of the fastener 10 show in FIG. 2, namely to releasably capture paper items such as posters, backers, headers, and the like, that are placed over the head 12 of the fastener 10 shown in FIG. 3.

The fastener 10 also includes a base 16 having two opposing notches 24, which engage with the tool 100 for insertion and removal of the fastener 10 (described in detail below).

Figure 4A:
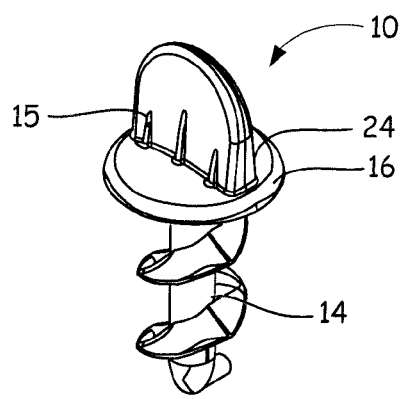
FIG. 4A shows a perspective view of a thumb screw fastener.
Figure 4B:
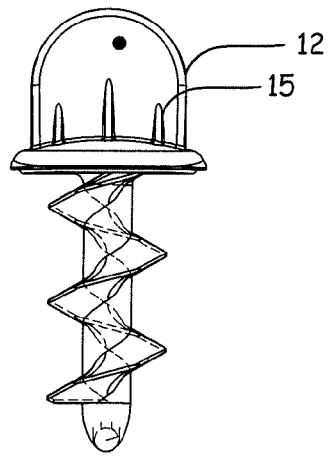
FIG. 4B shows a side view of the fastener of FIG. 4A.
Figure 4C:
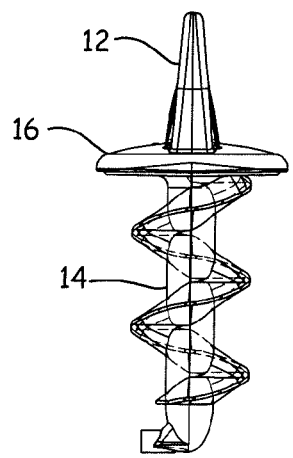
FIG. 4C shows a side of the fastener of FIG. 4A rotated 90° from the position show in FIG. 4B.

FIG. 4 show various views of an alternative fastener 10, and in particular a thumb screw fastener 10. The fastener 10 comprises a head 12, which has a thumbscrew shape allowing a user to insert and remove the fastener 10 with their thumb and finger. The fastener 10 includes a threaded stem 14 and a base 16 generally consistent in function with those shown for the fasteners 10 shown in FIGS. 2 and 3.

The head 12 can also be removed and inserted with the tool 100, described in detail below.

Figure 5A:
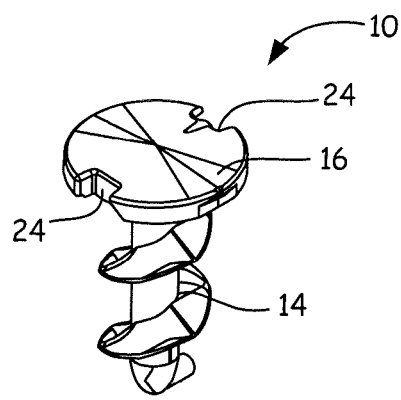
FIG. 5A shows a perspective view of a security fastener.
Figure 5B:
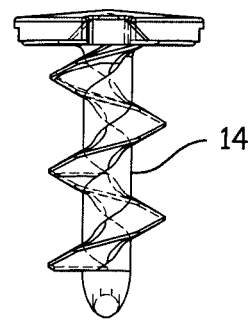
FIG. 5B shows a side view of the fastener of FIG. 5A.
Figure 5C:
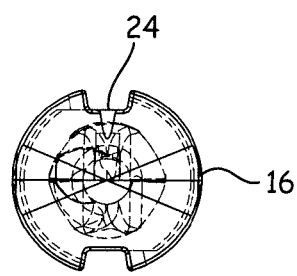
FIG. 5C shows a top view of the fastener of FIG. 5A.

FIG. 5 show various views of an alternative fastener 10, and in particular a security fastener 10. The fastener 10 has a threaded stem, but is without a defined protruding head. The fastener 10 has a base 16, and notches 24 for engagement with the tool 14 for removal and insertion. The fastener 10 is difficult to remove by hand, or with conventional tools, allowing it to be used to hold in place items subject to theft. This feature is particularly useful for in-store displays of valuable products. The fastener 10 can be removed with the tool 100.

Figure 6A:
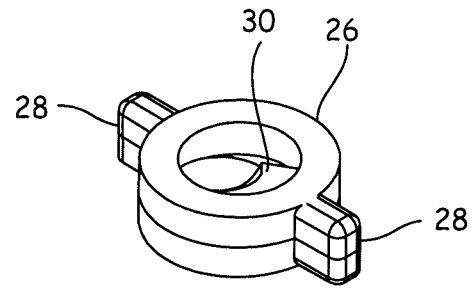
FIG. 6A shows a perspective view of a nut.
Figure 6B:
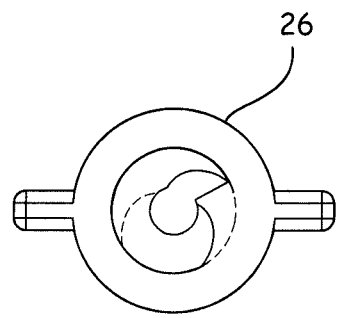
FIG. 6B shows a top view of the nut of FIG. 6A.

FIG. 6 show various views of a nut 26 that can be used with the fasteners 10 for further securement. The nut 26 includes wings 28 for grasping to thread the nut 26 on and off. The nut 26 has internal threads 30 that match the threads on the stem 14 of the fastener 10. The nut 26 can be used to construct dimensional objects, such as boxes, cartons, and display figures, or to secure items to brackets that may be affixed to the display surface.

Figure 7:
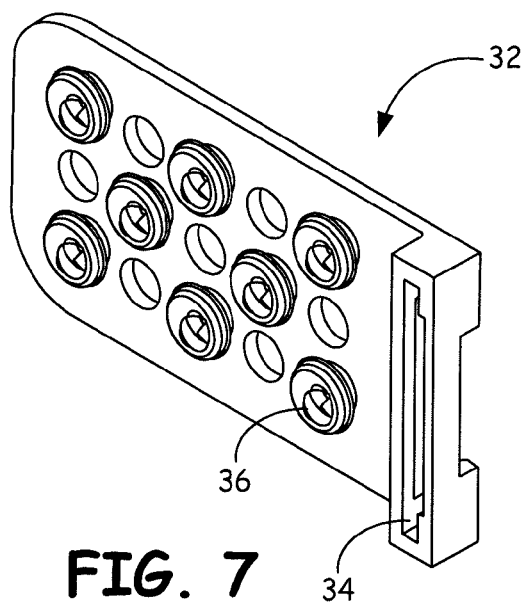
FIG. 7 shows various views of a bracket, with a female connector.

FIG. 7 shows a bracket 32 that can be attached to a display surface and that is compatible with the fasteners 10. The bracket comprises a connector 34, a female snap fit connector as shown in FIG. 7, and a plurality of holes 36. Each hole 36 has a built in threads that match the threads of the fasteners 10.

Figure 8:
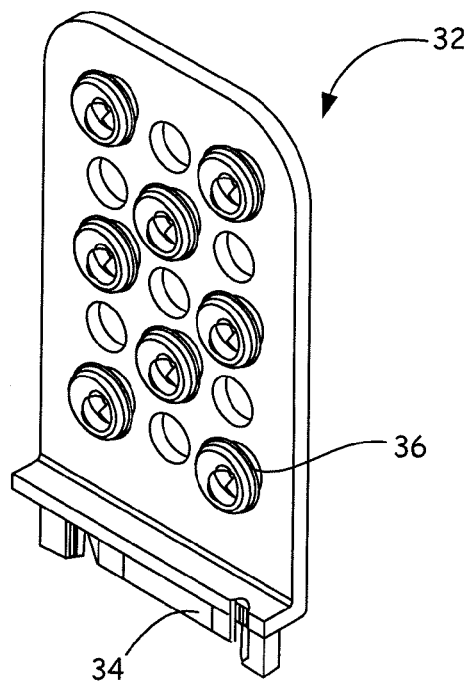
FIG. 8 shows various views of a bracket, with a male connector.

FIG. 8 shows a bracket 32 with a male connector 34 designed to make an L-shaped connection with the bracket 32 shown in FIG. 7. The brackets 32 (joined or separate) can be connected to the display surface with one or more fasteners 10, and then articles can be affixed to the brackets 32 with the fasteners 10 and/or nuts 26.

Figure 9:
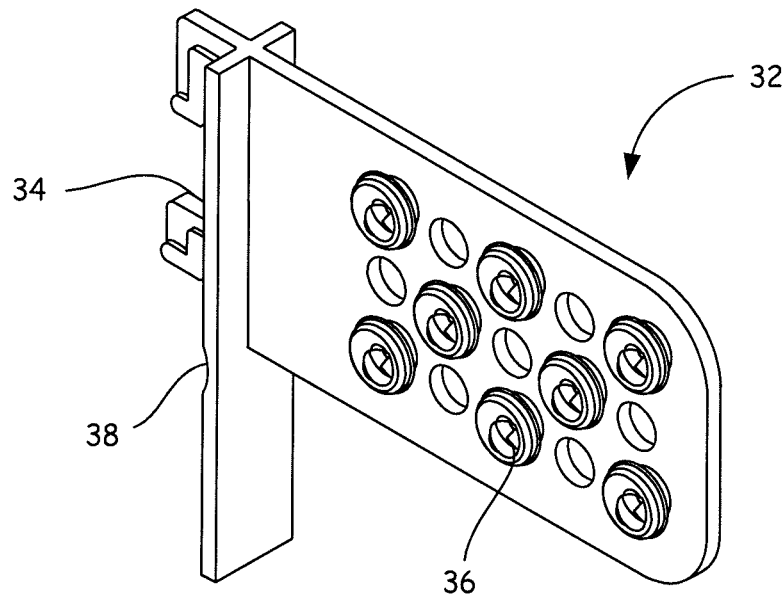
FIG. 9 shows various views of a bracket.

FIG. 9 shows a bracket 32 having a connector 34 and holes 36 (threaded) that is adapted for connection within slots 38 in a display surface. In the case of peg board displays, the bracket 32 can affix to the slots in the sides of the peg board.

Figure 10:
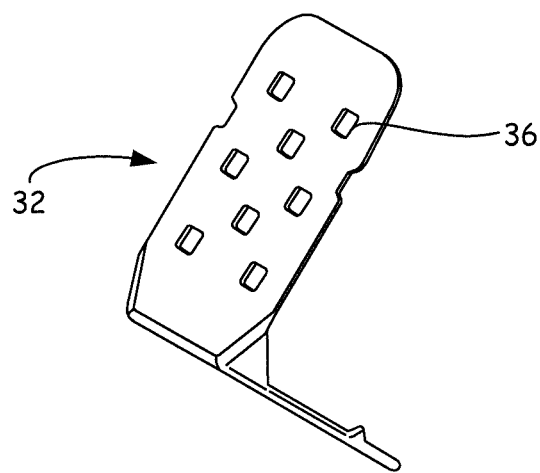
FIG. 10 shows various views of an L-shaped bracket.

FIG. 10 shows a bracket 32 that is a single piece L-shape. The L-shaped bracket 32 may have threaded holes 36 or not, and can otherwise be used the same as the previously described brackets 32.

Figure 11A:
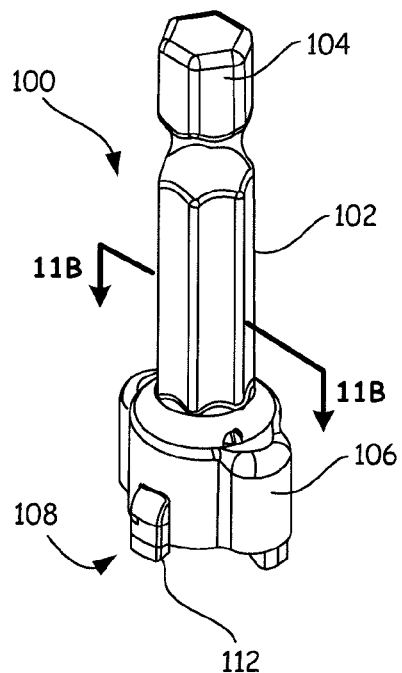
FIG. 11A shows a perspective view of a tool.
Figure 11B:
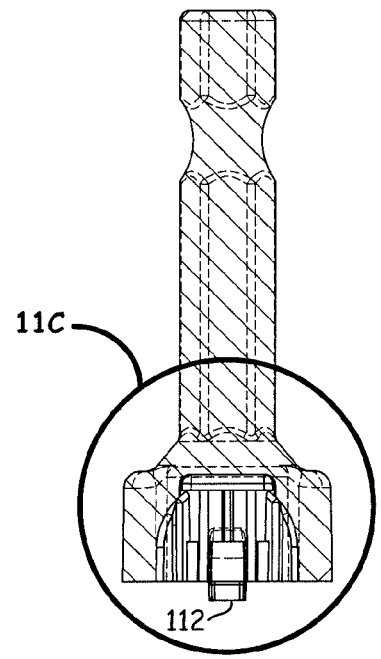
FIG. 11B shows a sectional view of the tool of FIG. 11A taken along the line labeled 11B in FIG. 11A.
Figure 11C:
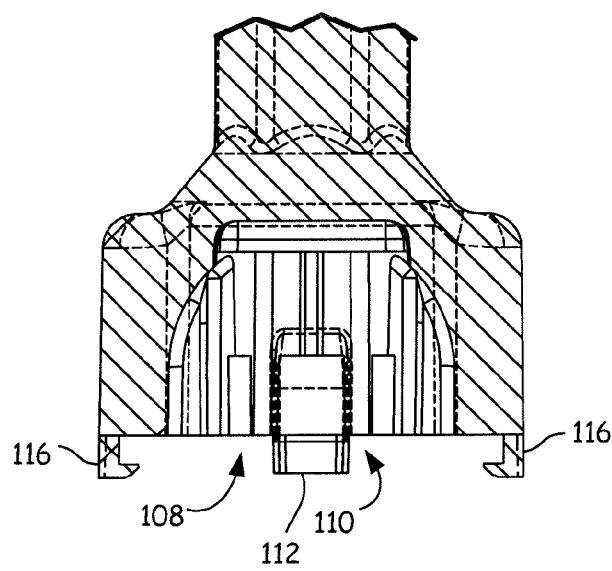
FIG. 11C is a sectional view of the circled portion of the tool shown in FIG. 11B.

FIG. 11 show various views of a tool 100 for insertion and removal of the fasteners 10 described above. The tool 100 has a shaft 102 that terminates in a hex head 104 to which a power drill (for example) can attach. The tool 100 has a base 106 for engaging the various heads 12 of the fasteners 10. The base 106 includes an internal cavity shaped to mate with the head 12 of the thumb screw fastener 10 of FIG. 4. While the fastener 10 of FIG. 4 is designed for manual use, the tool 100 can also be used. The internal cavity includes rib cavity members 108, which align and mate with the outer most ribs 15 of the head 12 of the fastener 10 of FIG. 4. The internal cavity includes hex shaped cavity portions 110, on opposing sides of the internal cavity, which engage the hex head 12 of the fastener 10 shown in FIG. 2.

The tool 100 also includes feet 112 to engage the notches 24 in the base 16 of the fastener 10 shown in FIGS. 3 and 5. In this manner, the tool 100 is compatible with all of the fasteners 10 of the present invention. The tool 100 further comprises opposing claws 116 that can grip the base 16 of the fastener 10 during insertion to make it easier to insert the fasteners 10.

Figure 12:
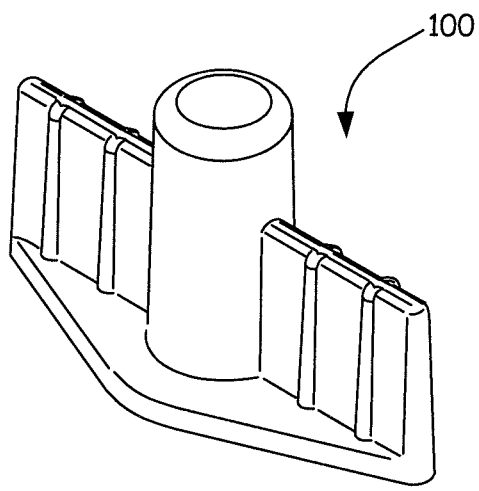
FIG. 12 shows various views of a tool.
Figure 13:
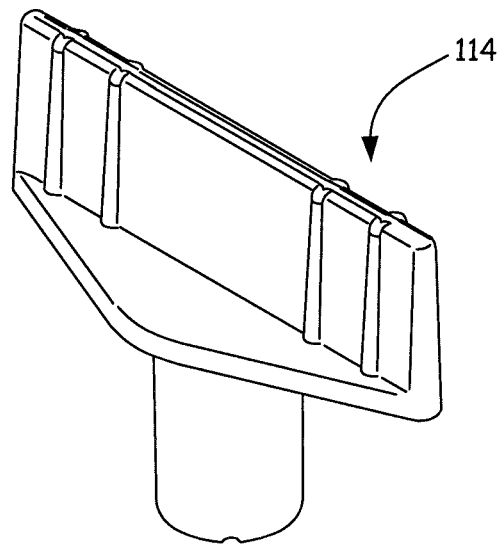
FIG. 13 shows various views of a handle.

FIG. 12 shows a tool 100 that is a hand operated version of the tool 100 shown in FIG. 11, otherwise the tool 100 is the same. FIG. 13 show a handle 114 that includes an internal hex shaped cavity 116 that can engage the hex head 104 of the tool 100 shown in FIG. 11, or can directly engage the hex head 12 of the fastener 10 shown in FIG. 2.

Figure 14:
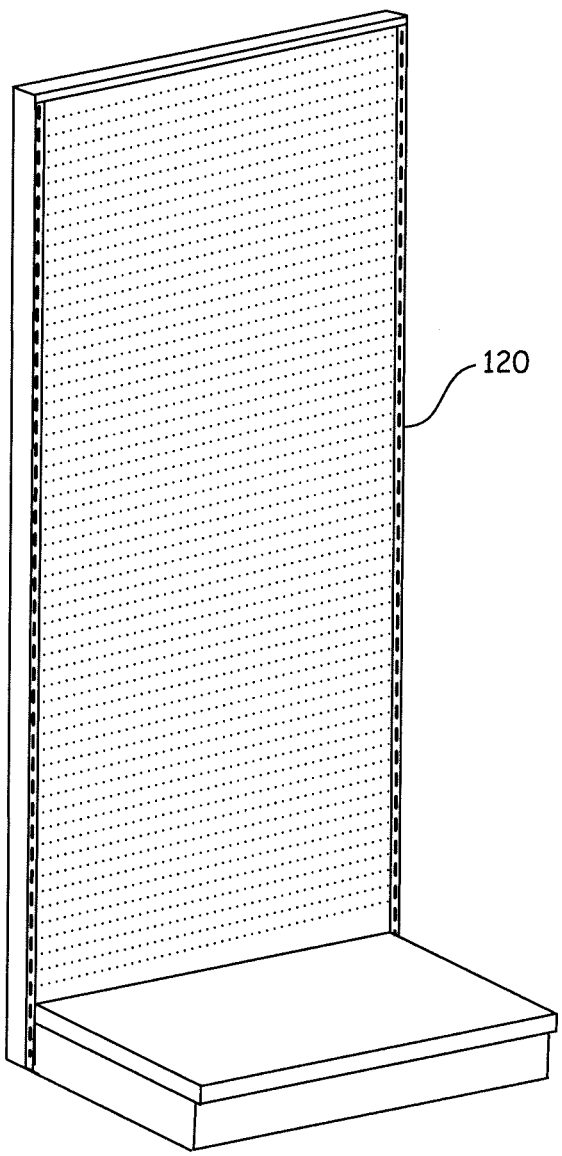
FIG. 14 shows a peg board display.
Figure 15:
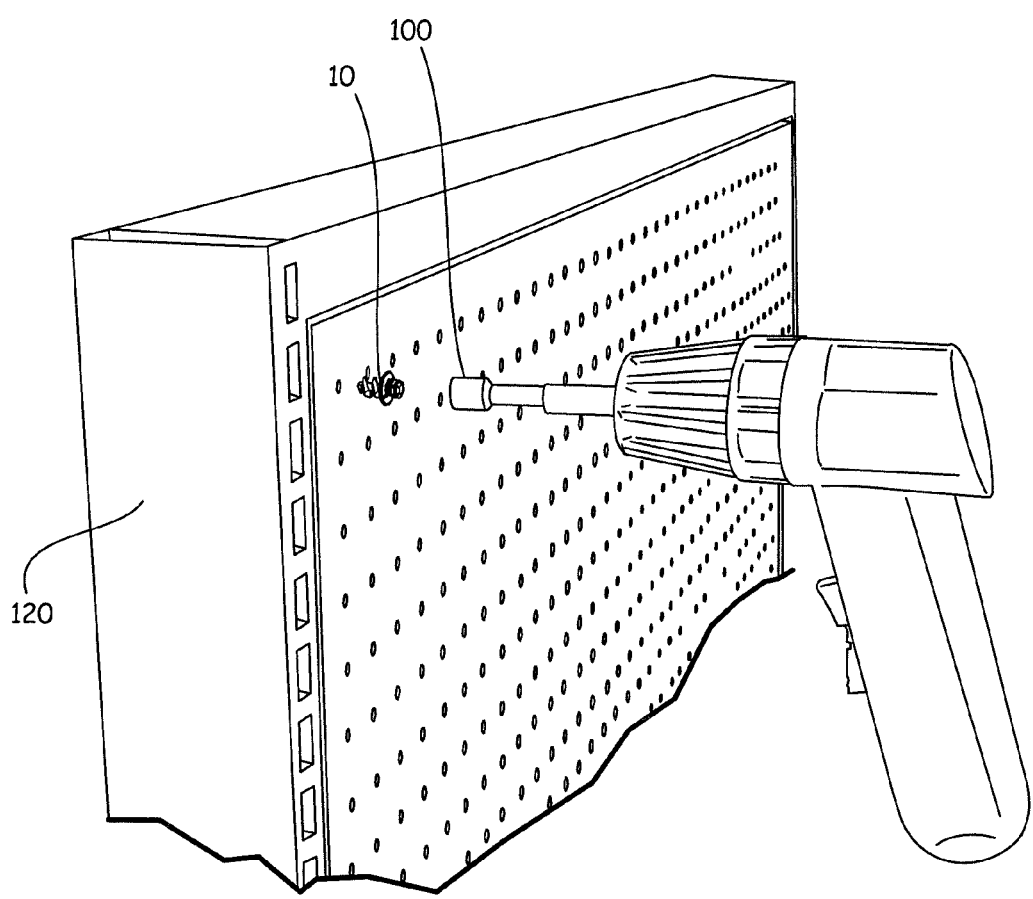
FIG. 15 shows a peg board display, fastener, and drill with tool bit.

In operation, the components described above can be used in combination with a display surface such as a peg board display 120 shown in FIG. 14, which is commonly used in retail stores and in other establishments. The fasteners 10 are designed for insertion into the holes of the display 120, as shown in FIG. 15, with the tool 100 (either by hand or with a power tool as shown in FIG. 15). In one aspects of the invention, the fasteners 10 would be inserted into each corner, or around the perimeter of the display 120, and act as anchors for later attachment of display materials.

Figure 16A:
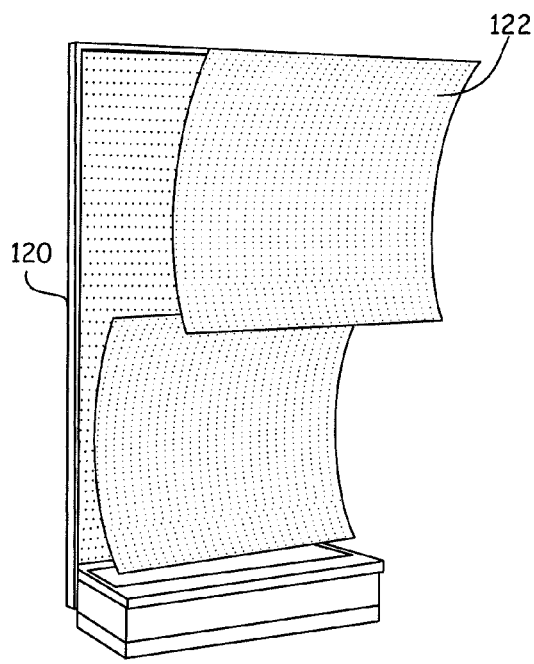
FIGS. 16 a, b show a peg board display with backer paper.
Figure 16B:
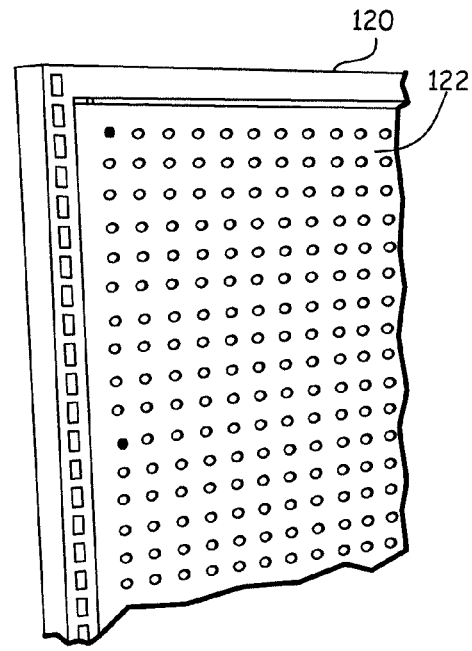

FIG. 16a shows display material 122, such as a backer display, attached to the display 120 by inserting holes in the material 122 over the head 12 of the fastener 10. Commonly backers are used to cover the display 120. Backers are frequently removed, for example, to accommodate seasonally decorated displays (or for other reasons). The present invention, firmly secures the backer to the display 120, but the backer can be easily removed without removing the fasteners 10. In the prior art, to remove and replace the backer required removing the fasteners, which was difficult and time consuming. Removal required prying the fasteners out of the holes of the display, often resulting in destruction of the fasteners and damage to the holes of the display; or, if the fasteners were removed without destroying them the force needed to remove them sent them flying across the room which was hardly any better than destroying them. Once the old fasteners were removed, new fasteners had to be inserted, and on and on and on—each time a backer needed replacement. The present invention eliminates these problems, as backers can be removed and replaced without any change to the underlying fasteners.

Figure 17:
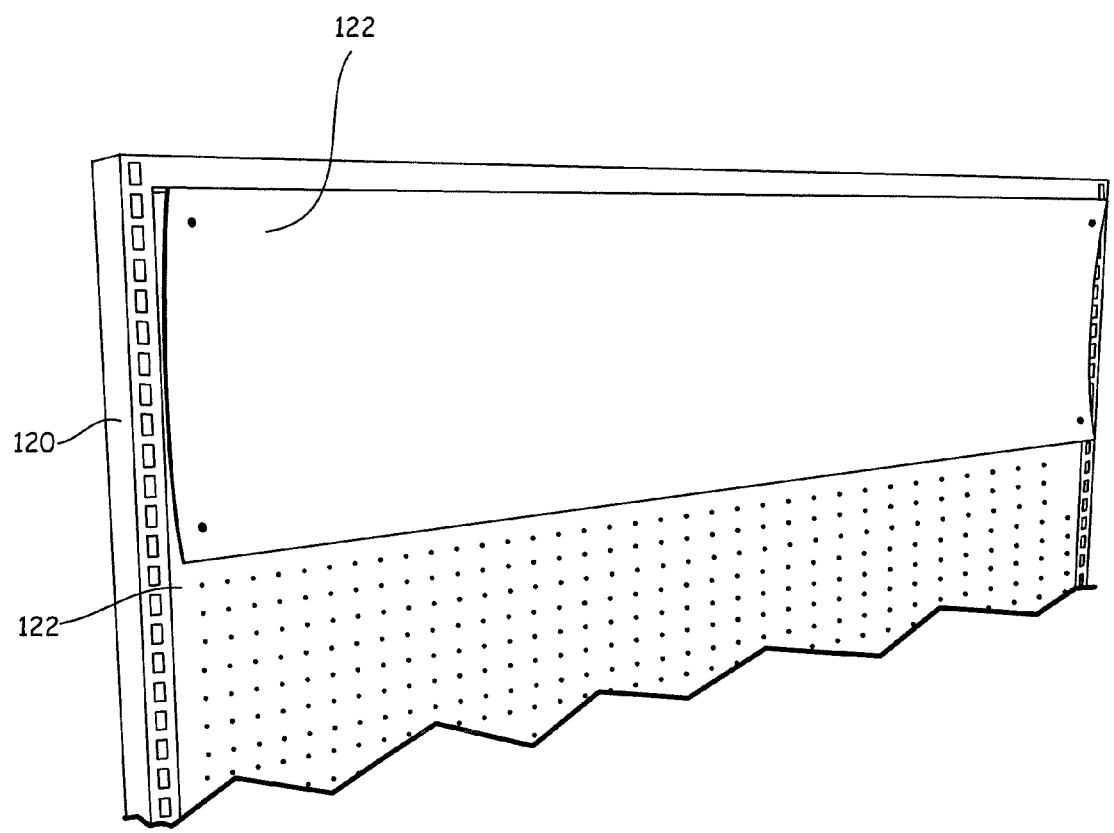
FIG. 17 shows a peg board display and header.

Furthermore, multiple layers of display materials 122 can be applied over the heads 12 of the fasteners 10. As shown in FIG. 17, a header can be applied directly over the backer by merely pressing the holes in the header over the heads 12 of the fasteners 10. Headers are also frequently replaced, as they contain advertising and promotional material that typically used for a limited period of time. Again, in the prior art there is no way to secure or change the header, except to remove the fasteners in the exasperating fashion described above. The present invention suffers no similar limitations.

Figure 18:
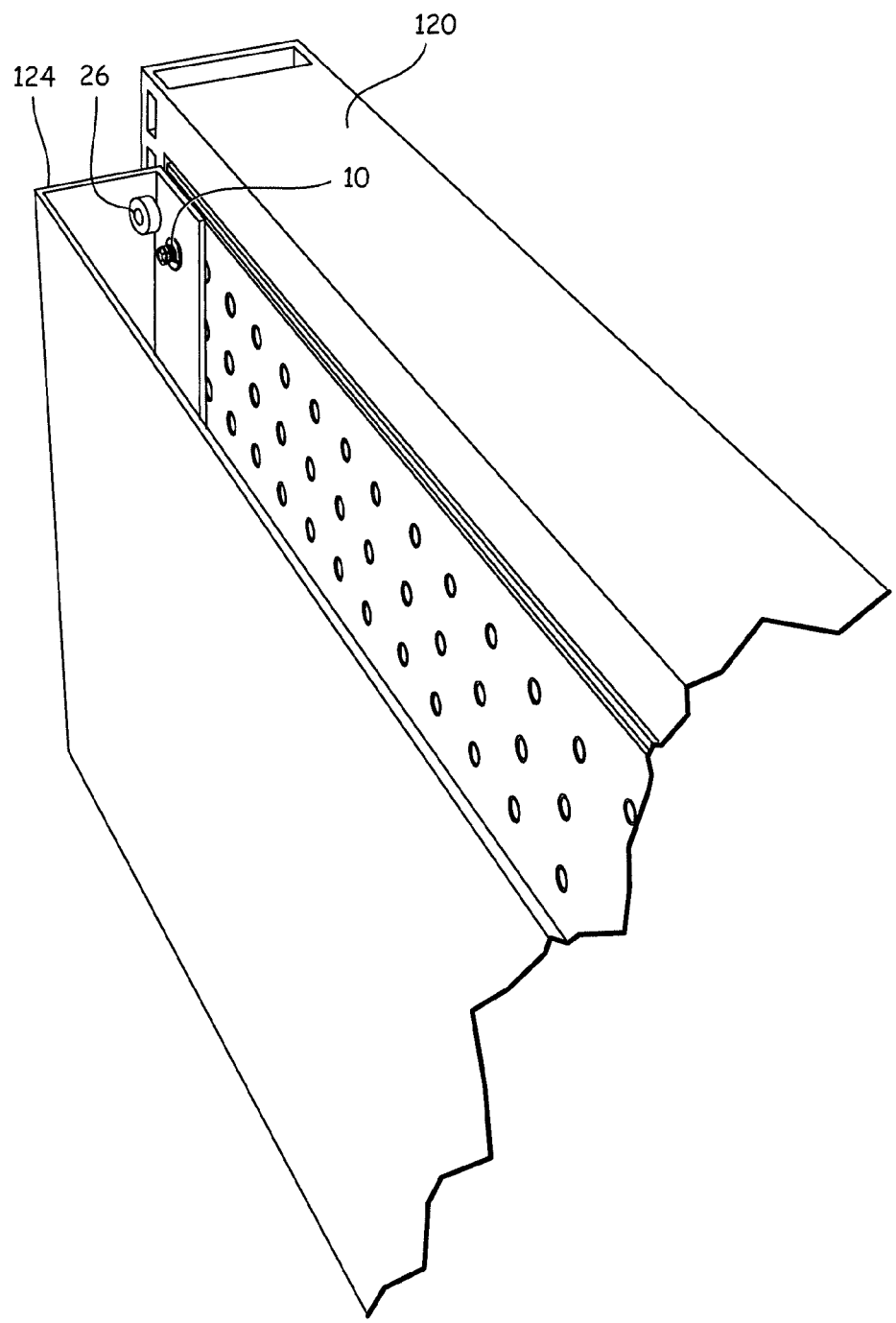
FIG. 18 shows a peg board display and dimensional header.

FIG. 18 shows the present invention used with dimensional display material 124, such as a shaped or dimensional header. The header is affixed to the display 120 by placing the header over the head 12 of the fastener 10 (in this case the fastener shown in FIG. 2) and placing a nut 26 (threaded to match the threads of the head 12) over the exposed end of the fastener 10. In a similar manner, the brackets 32 can be attached to the display 120, and any other combination of materials. The present invention is enormously flexible in the way it can be used, without requiring removal of the fasteners; however, if removal is desirable this can be done easily and without damaging the underlying display 120.

As described above, the fasteners can be used on other surfaces besides peg board. The fasteners can be applied directly to wood, stucco, or masonry walls by drilling a hole in the wall and then inserting the fasteners as described herein. The displays can be standard peg board of the type shown in the Figures or specialty displays that are designed with a minimal number of holes in specific patterns. These types of displays are sometimes used as in-store displays. The fasteners can be used to assemble dimensional items as well.

Figure 19:
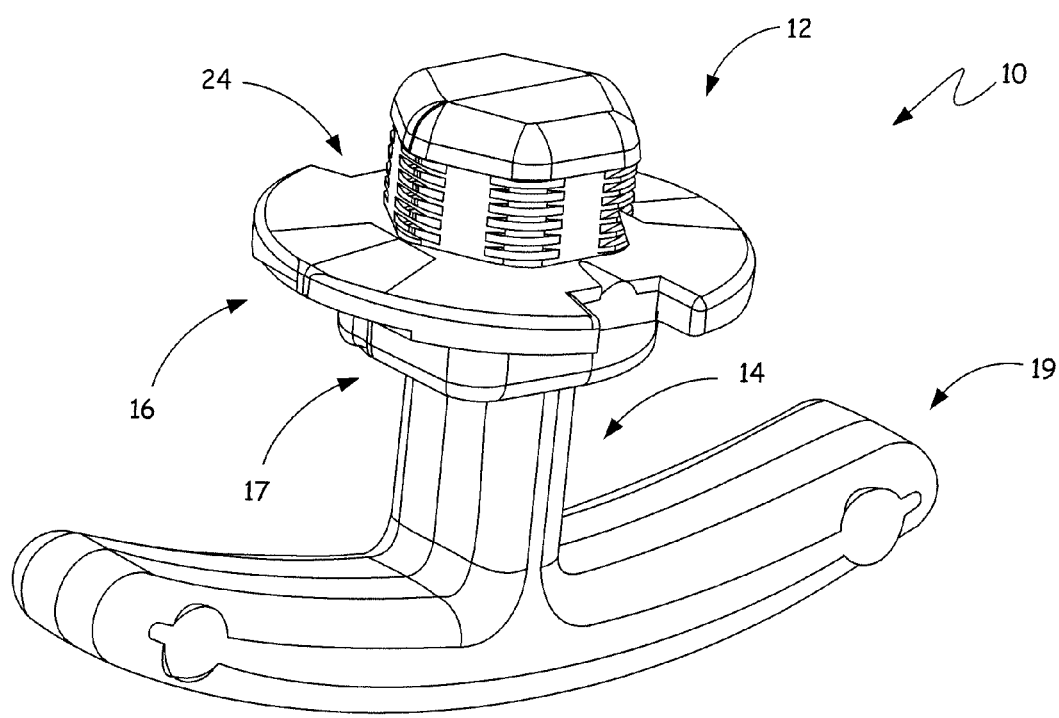
FIG. 19 shows a slatwall fastener.
Figure 20A:
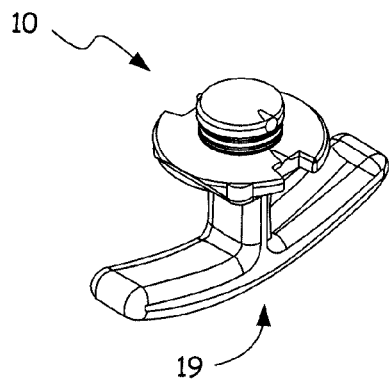
FIG. 20A shows a perspective view view of the slatwall fastener.
Figure 20B:
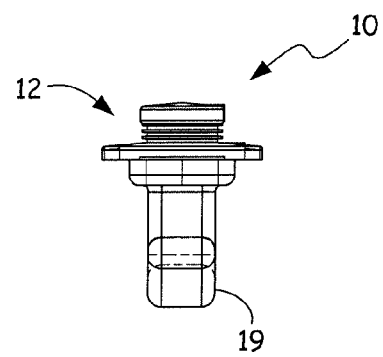
FIG. 20B shows a side view of the fastener of FIG. 20A.
Figure 20C:
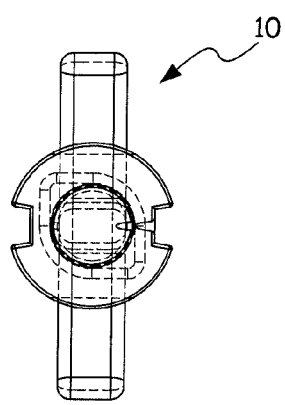
FIG. 20C shows a top view of the fastener of FIG. 20A.
Figure 20D:
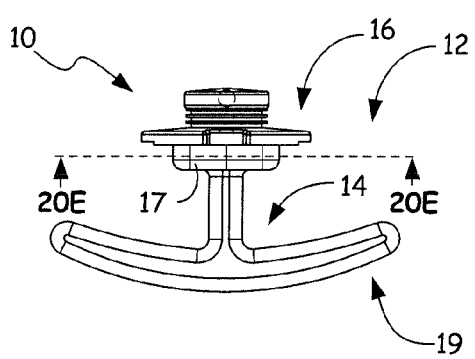
FIG. 20D shows a side view of the fastener of FIG. 20A rotated 90° from the position show in FIG. 20B.
Figure 20E:
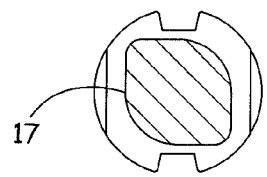
FIG. 20E is a sectional view of the fastener of FIG. 20A taken along the line labeled 20E in FIG. 20D.

In another embodiment of the present invention, FIG. 19 shows a fastener 10 adapted for use with slatwall systems. Slatwall panels include elongated horizontal slots to which items can be attached. The slots are narrow at the end near the surface of the panel and wide at the bottom. A slot in a slatwall panel has a side profile that looks like an upside down letter T.

The fastener 10 includes a head 12, which in this case is hexagonal in shape as described above and includes threads. The fastener 10 includes a stem 14 which depends downward from a base 16. The stem 14 attaches to a retainer 19. The retainer 19 is elongated along a longitudinal axis, and has a much narrow transverse profile. This allows the retainer 19 to be placed in a slot of a slatwall, when the longitudinal axis of the retainer 19 is parallel to the axis of the horizontal aligned slatwall slot. Upon insertion of the retainer in the slot, the fastener 10 is turned 90° in either direction and the longitudinal axis of the retainer 19 is then perpendicular to the horizontal slatwall slot, and retained therein. The retainer 19 is biased as shown so that the retainer 19 is arcuate, or curved. This allows the retainer 19 to act like a spring when in place such that the terminal ends of the retainer 19 grip the slot holding the fastener 10 in place.

The fastener 10 also includes a stop 17 located on the underside of the base 16. The stop 17 if flattened on two sides, has opposing somewhat rounded edges and opposing somewhat squared off edges. The stop is shaped to allow the fastener 10 to initially easily turn from the insertion position to the retention position, but then stop turning when the fastener 10 has been rotated 90° thereby signaling that the fastener 10 is in place. The stop 17 engages with the upper narrow portion of the slot of the slatwall to accomplish this purpose.

The fastener 10 includes opposing notches 24 to allow the fastener 10 to be removed and inserted with the tool described herein above. The fastener 10, although shown with a hex shaped head in FIG. 19, and be configured with any of the various head described herein above or below. Thus, enabling the use of all the advantages and embodiments of the present invention described in reference to peg boards to be used with slatwall as well.

FIG. 20 show various views of the fastener 10 shown in FIG. 19. The head 12 of the fastener 10 is different, however, from the head 12 shown in FIG. 19, but as described above the head 12 of the fastener 10 with the retainer 19 is fully interchangeable with any of the fasteners shown herein.

Figure 21:
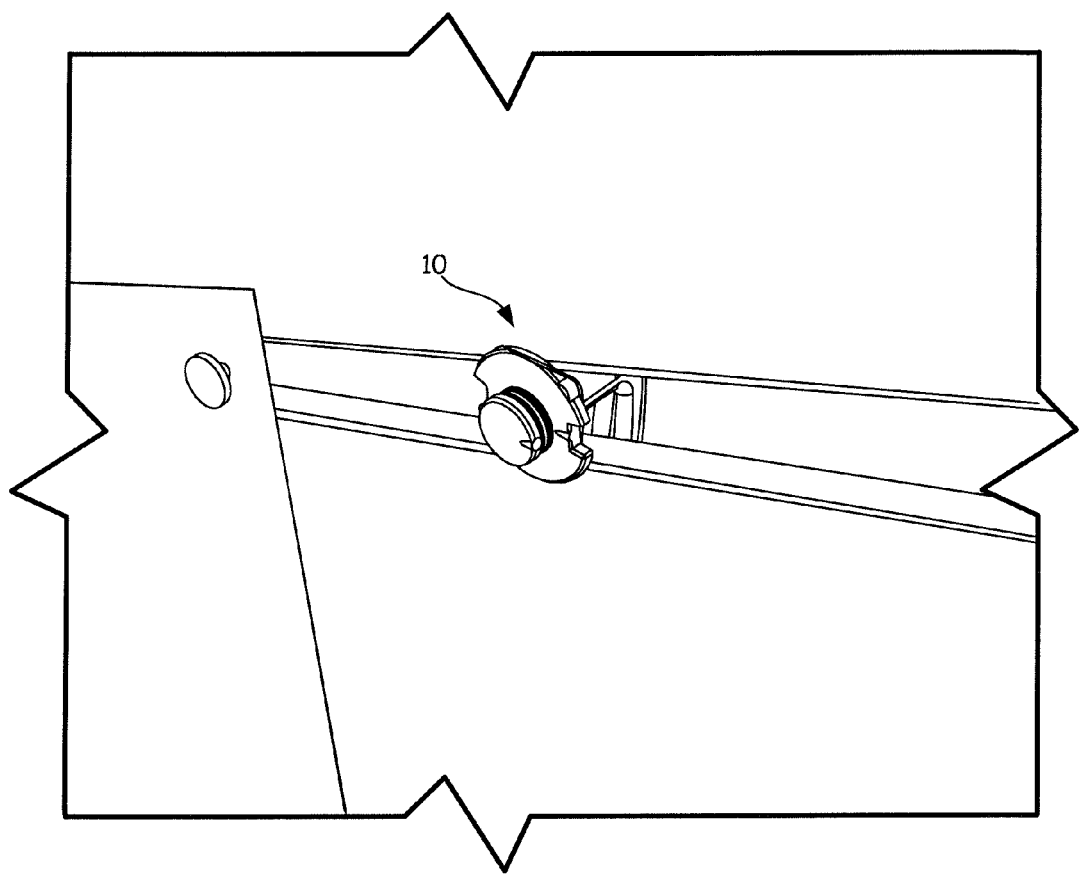
FIG. 21 shows the slatwall fastener attached to a slatwall slat.

FIG. 21 shows the fastener 10 engaged in the slot of a slatwall display. The head 12 extends from the slatwall allow access and use as set forth herein.

Figure 22A:
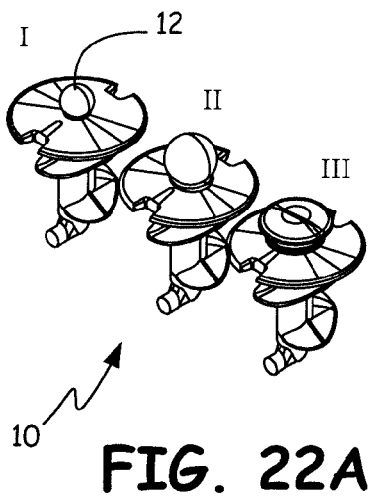
FIG. 22A shows perspective views of a fastener, wherein fasteners labeled I and II are have a ball head and fastener labeled III has a low profile head.
Figure 22B:
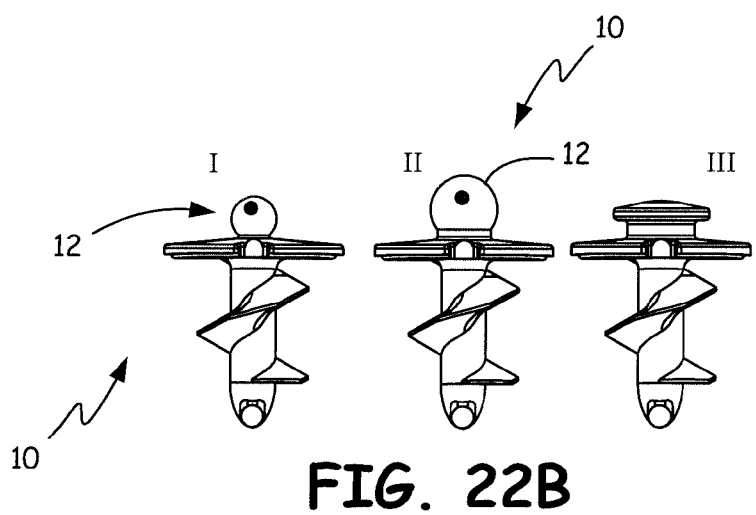
FIG. 22B shows side views of the fasteners of FIG. 22A, wherein fasteners labeled I and II are have a ball head and fastener labeled III has a low profile head.
Figure 22C:
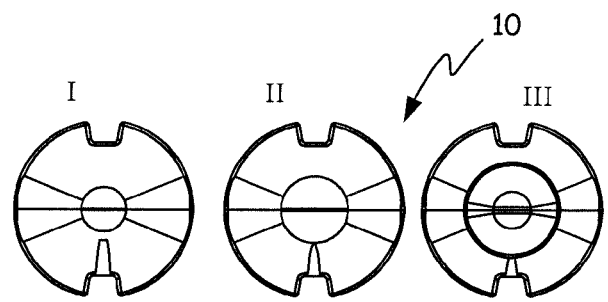
FIG. 22C shows top views of the fasteners of FIG. 22A, wherein fasteners labeled I and II are have a ball head and fastener labeled III has a low profile head.

FIG. 22 shows various views of a fastener 10 with a head 12 that comprises a ball (and one having a low profile head). The ball can be of various sizes. The ball allows for users to place items over the ball and have them retained thereon, in a manner similar to the fastener shown in FIGS. 2 and 3. This application would include, retaining backers and the like. The fastener 10 shown in FIG. 22 can be configured for slatwall by including the stem 14 and retainer 19 as shown in FIG. 19.

Figure 23A:
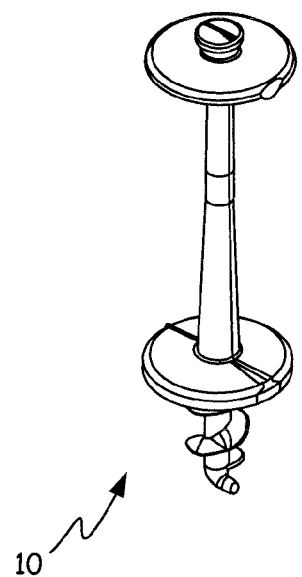
FIG. 23A shows a perspective view of an elongated fastener.
Figure 23B:
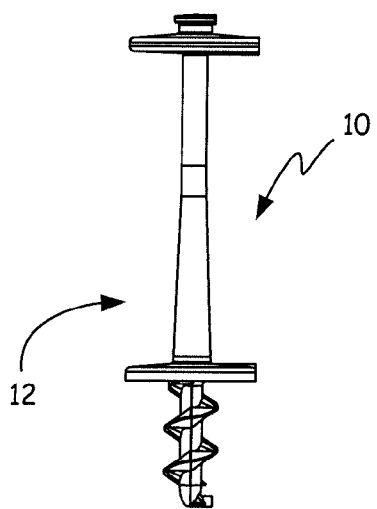
FIG. 23B shows a side view of the fastener of FIG. 23A.
Figure 23C:
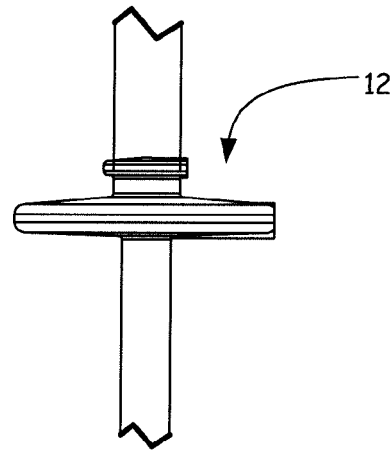
FIG. 23C shows a partial side view of the fastener of FIG. 23A.
Figure 24:
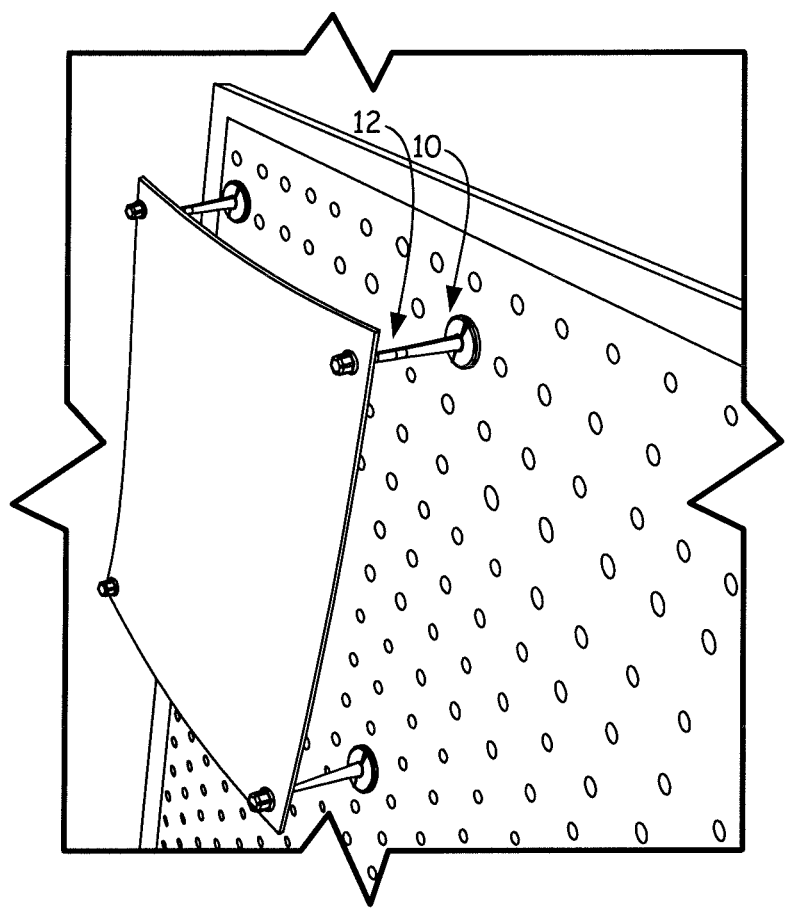
FIG. 24 shows the elongated fastener attached to a peg board display.
Figure 25A:
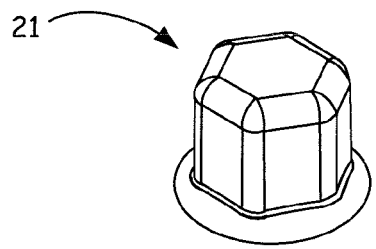
FIG. 25A shows a perspective view of a fastener nut.
Figure 25B:
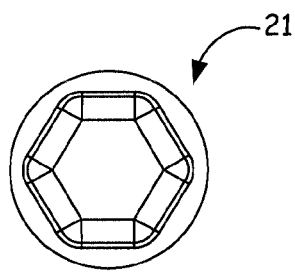
FIG. 25B shows a top view of the fastener nut of FIG. 25A.
Figure 25C:
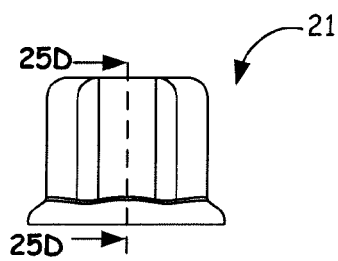
FIG. 25C shows a side view of the fastener nut of FIG. 25A.
Figure 25D:
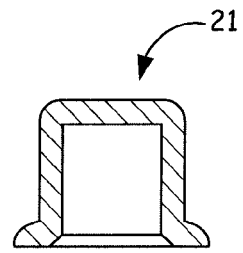
FIG. 25D shows a sectional view of the fastener of FIG. 25A taken along the line labeled 25D shown in FIG. 25C.

FIG. 23 shows various views of an extended fastener 10, with a long necked head 12. A shown in FIG. 24, the fastener 10 can be used (for example) to attach a sign or other item to peg board or slatwall, especially when it is desired that the sign or other item extend some distance from the display surface. The fastener 10 show in FIGS. 23 and 24 can be configured for slatwall by including the stem 14 and retainer 19 as shown in FIG. 19.

FIG. 25 shows various view of a threaded nut 21 that can attach to the head 12 of a fastener 10, and in particular the fastener 10 show in FIGS. 2 and 19.

Figure 26:
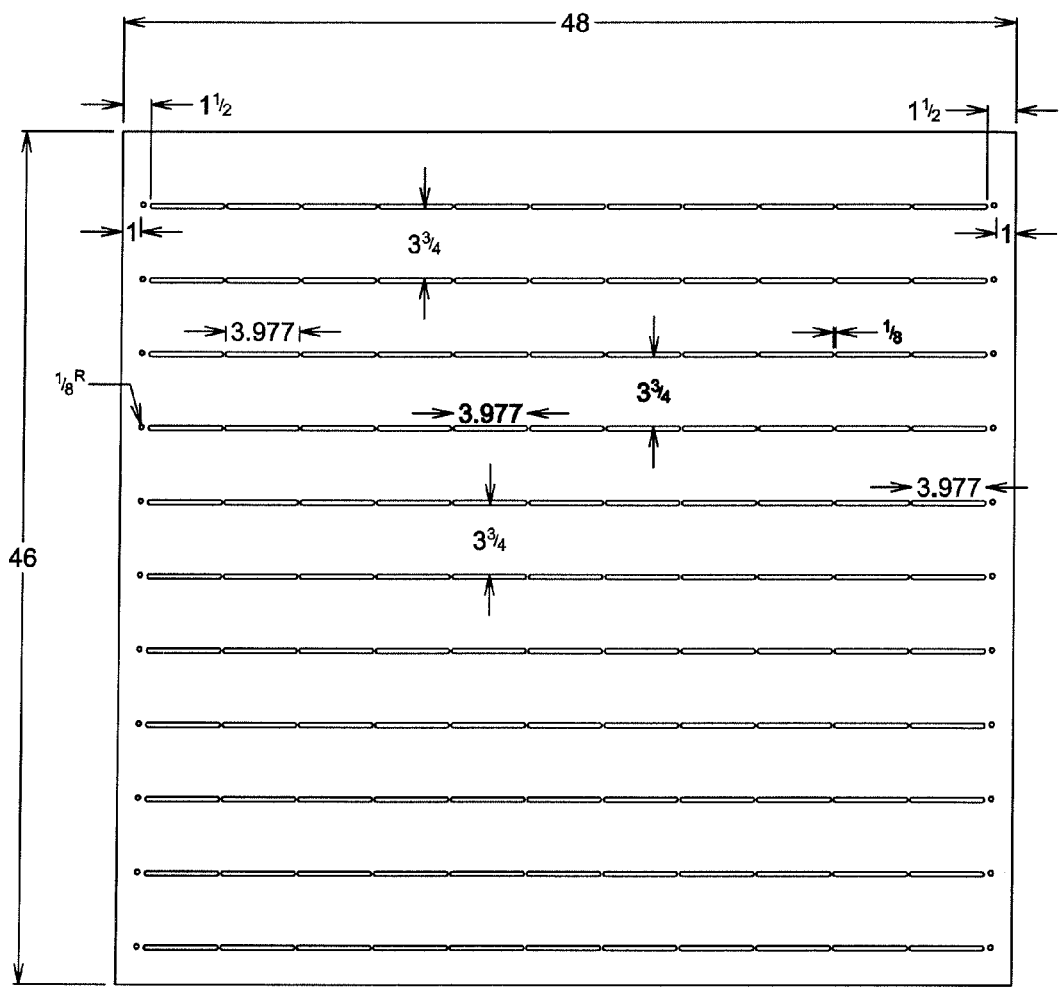
FIG. 26 shows a slatwall backer.

FIG. 26 shows a backer 23 adapted for use with slatwall displays. The backer 23 can be made from paper, or other suitable material, and can be retained in place by affixing to the head 12 of the clip 10. As described herein, in the prior art backers are commonly used with displays, and are frequently replaced based on seasonal considerations or other periodic changes to the look of the displays. In the prior art, it was very difficult to remove and replace the backer because it required removal of the prior art clips. Backers were next to impossible to use with slatwall displays due to the lack of an adequate method of attachment. The present invention eliminates this drawback by allowing the backer to be affixed to the head 12 of one or more of the fasteners 12 shown herein, and in particular to the fastener 11 adapted for use with slatwall displays. The fasteners 10 can be attached to the perimeter of the display, and the backer 23 then pressed over the head 12 of the fastener 10. The head 12 includes one or more devices as shown herein that retain the backer 23, but still provide an undemanding way to remove the replacing the backer 23. The backer 23 includes predefined perforations that align with the slots in the slatwall, and/or holes that can fit over the head 12 of the fastener 10.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. Those of ordinary skill in the art that have the disclosure before them will be able to make modifications and variations therein without departing from the scope of the invention.

The invention claimed is:

1. A fastener for securement to a surface having a slot, comprising:
   a head which when the fastener is secured to the surface protrudes at least partially above the surface;
   a base at the bottom of the head which when the fastener is secured to the surface contacts at least a portion of the surface;
   a stop located below the base;
   a stem depending from the base which when the fastener is secured to the surface is located below the surface; and
   a retainer connected to the stem that can be rotated between an insertion position and a retention position by engaging and disengaging with the slot.

2. The fastener of claim 1 wherein the retainer has a substantially elongated axis which is aligned with the slot when in the insertion position and is transverse to the slot when in the engaged position.

3. The fastener of claim 1 wherein display materials can be secured and removed from the head of the fastener without removing the fastener.

4. The fastener of claim 1 wherein the retainer is biased to enhance retention.

5. The fastener of claim 1 wherein when the fastener is in the retention position the base is pressed against the surface and the retainer is pressed against a bottom surface of the slot forming to retain the fastener in place.

6. The fastener of claim 1 wherein the base of the fastener includes a feature for engaging with a tool to allow the fastener to be removed and inserted into the surface.

7. The fastener of claim 6 wherein the feature comprises opposing notches.

8. The fastener of claim 1 wherein the head of the fastener comprises a retention notch.

9. The fastener of claim 1 wherein the head of the fastener comprises a circular flange.

10. The fastener of claim 1 wherein the head of the fastener comprises a ball.

11. The fastener of claim 1 wherein the head is a security head.

12. The fastener of claim 1 wherein the head is a low profile head.

13. The fastener of claim 1 further comprising a nut that can secure to the head.

14. The fastener of claim 13 wherein the nut and head are threaded.

15. The fastener of claim 1 wherein the head is hexagonal.

16. The fastener of claim 1 wherein in the fastener comprise a thumbscrew shaped head.

17. The fastener of claim 1 wherein the stop grips an upper portion of the slot when the fastener is in the retention position and is released when the fastener is in the insertion position.

18. A fastener for securement to a surface having a slot, comprising:
- a head which when the fastener is secured to the surface protrudes at least partially above the surface;
- a base at the bottom of the head which when the fastener is secured to the surface contacts at least a portion of the surface and includes opposing notches to allow the fastener to be removed and inserted with a tool;
- a stop located below the base which grips an upper portion of the slot when the fastener is in the retention position and is released when the fastener is in the insertion position;
- a stem depending from the base which when the fastener is secured to the surface is located below the surface; and
- a biasing retainer connected to the stem that can be rotated between an insertion position and a retention position by engaging and disengaging with the slot having a substantially elongated axis which is aligned with the slot when in the insertion position and is transverse to the slot when in the engaged position.

19. The fastener of claim 18 wherein the head of the fastener comprises a circular flange.

20. The fastener of claim 18 wherein the head of the fastener comprises a ball.

21. The fastener of claim 18 wherein the head is a security head.

22. The fastener of claim 18 wherein the head is a low profile head.

23. The fastener of claim 18 further comprising a nut that can secure to the head.

24. The fastener of claim 23 wherein the nut and head are threaded.

25. The fastener of claim 18 wherein the head is hexagonal.

* * * * *

UNITED STATES PATENT AND TRADEMARK OFFICE
CERTIFICATE OF CORRECTION

| | | |
|---|---|---|
| PATENT NO. | : 9,347,477 B2 | |
| APPLICATION NO. | : 14/171263 | |
| DATED | : May 24, 2016 | |
| INVENTOR(S) | : Rick David Anderson | |

It is certified that error appears in the above-identified patent and that said Letters Patent is hereby corrected as shown below:

In the claims,

Column 8, line 47, In claim 5, line 4, delete "forming".

Signed and Sealed this
Ninth Day of August, 2016

Michelle K. Lee
*Director of the United States Patent and Trademark Office*